United States Patent
Dahl

(10) Patent No.: US 7,670,980 B2
(45) Date of Patent: Mar. 2, 2010

(54) CUBIC BORON NITRIDE CUTTING TOOL INSERT WITH EXCELLENT RESISTANCE TO CHIPPING AND EDGE FRACTURE

(75) Inventor: Leif Dahl, Hägersten (SE)

(73) Assignee: Sandvik Intellectual Property AB, Sandviken (SE)

( * ) Notice: Subject to any disclaimer, the term of this patent is extended or adjusted under 35 U.S.C. 154(b) by 0 days.

(21) Appl. No.: 11/585,937

(22) Filed: Oct. 25, 2006

(65) Prior Publication Data

US 2007/0099030 A1 May 3, 2007

(30) Foreign Application Priority Data

Oct. 28, 2005 (SE) .................................... 0502391

(51) Int. Cl.
*C04B 35/5831* (2006.01)

(52) U.S. Cl. .................................... 501/96.4; 501/96.3

(58) Field of Classification Search ................. 501/96.3, 501/96.4
See application file for complete search history.

(56) References Cited

U.S. PATENT DOCUMENTS

| 4,343,651 | A |   | 8/1982  | Yazu et al. |          |
|-----------|---|---|---------|-------------|----------|
| 4,911,756 | A |   | 3/1990  | Nakai et al.|          |
| 5,328,875 | A | * | 7/1994  | Ueda et al. | 501/87   |
| 6,001,757 | A | * | 12/1999 | Fukaya et al.| 501/96.4|
| 6,140,262 | A | * | 10/2000 | Collier et al.| 501/96.4|
| 6,265,337 | B1|   | 7/2001  | Kukino et al.|         |
| 6,635,593 | B1| * | 10/2003 | Kukino et al.| 501/96.4|
| 7,081,424 | B2| * | 7/2006  | Okamura et al.| 501/96.4|

FOREIGN PATENT DOCUMENTS

| EP | 0 834 486 A2 | 4/1998  |
| EP | 0 879 806 A1 | 11/1998 |
| EP | 0 974 566    | 1/2000  |
| EP | 1 498 199    | 1/2005  |

(Continued)

OTHER PUBLICATIONS

Machine translation of JP 08-126903, May 1996.*
Machine translation of JP 07-328814, Dec. 1995.*

*Primary Examiner*—Karl E Group
(74) *Attorney, Agent, or Firm*—Drinker Biddle & Reath LLP

(57) ABSTRACT

A cutting tool insert which can, for example, be used for machining of hardened steel, hot and cold working tool steel, die steel, case hardened steel, high speed steel and ductile grey cast iron and composed of a composite comprising a cBN-phase and a binder phase comprising a titaniumcarbonitride phase and a $TiB_2$ phase is disclosed. In the XRD pattern from the composite using CuKa-radiation, the peak height ratio of the strongest (101) $TiB_2$ peak and the strongest cBN (111) peak is less than about 0.06, the (220) from the titanium carbonitride phase in the XRD-pattern intersects both vertical lines of the PDF-lines of TiC (PDF 32-1383) and TiN (PDF 38-1420) and the lowest intersected point height is at least about 0.15 of the maximum (220) peak height of the ceramic binder phase. The insert is made by powder metallurgical methods milling, pressing and sintering, the sintering being performed at lowest possible temperature for shortest possible time necessary to obtain a dense structure.

16 Claims, 3 Drawing Sheets

FOREIGN PATENT DOCUMENTS

| | | | |
|---|---|---|---|
| JP | 07172919 | * | 7/1995 |
| JP | 07328814 | * | 12/1995 |
| JP | 08126903 | * | 5/1996 |
| JP | 09011006 | * | 1/1997 |
| JP | 2000-247746 | | 9/2000 |
| WO | 2004/105983 | | 12/2004 |
| WO | WO 2006/046125 A1 | | 5/2006 |

* cited by examiner

CUBIC BORON NITRIDE CUTTING TOOL INSERT WITH EXCELLENT RESISTANCE TO CHIPPING AND EDGE FRACTURE

BACKGROUND OF THE INVENTION

The present invention relates to a cutting tool insert including cubic boron nitride with an excellent resistance to chipping and edge fracture when machining hard materials like hardened steel and alike materials.

Cubic boron nitride (cBN)-based ceramics sintered under high pressure and high temperature are known.

Generally, cBN-based materials for hard part machining comprise cBN as the hard dispersed phase and a ceramic binder which forms a sintered hard cutting tool insert. The ceramic binder phase of the cBN cutting tool insert with 40-80% cBN by volume comprises generally a nitride, carbonitride or carbide of titanium with smaller amounts of borides of Ti, W, Co, Al or a solid solution of these, alumina and other unavoidable reaction products. By varying the relative amounts of the ingredients, cBN tools can be designed for optimum performance in different applications, e.g. continuous or interrupted cutting. cBN tools with relatively high cBN content are recommended for interrupted to heavy interrupted cutting applications, whereas a high ceramic binder content gives high wear resistance in continuous cutting. The severe conditions in interrupted cutting usually cause edge failure and thus determine the lifetime for the tool rather than other wear modes such as notch or crater wear. Even in a continuous application, machine instability may cause an intermittent behaviour causing early edge failure. In particular, the above mentioned cBN cutting tool with a cBN content in the range of 40-80% by volume comprising a nitride, carbonitride or carbide of titanium are commonly subjected to a wide range of cutting applications ranging from continuous ones with high demands of wear resistance and interrupted ones with high demands of failure resistance. Thus it is of great interest to gain both edge failure and wear resistance in the above-mentioned cBN cutting tool.

In the past, it has been proposed to use an intermediate adhesion phase between the ceramic binder and the hard dispersed phase (EP-A-1498199) in order to increase chipping resistance. A bonding phase surrounding the cBN grains has also been proposed (EP-A-974566) in order to prevent a direct cBN-cBN contact. The bonding phase is formed due to a chemical reaction between cBN or $B_2O_3$ residuals coating the cBN grains and the ceramic binder forming $TiB_2$. Furthermore, cBN grains have been pre-coated by a nitride or boride of Ti and Al by a PVD-process in order to enhance the reinforcing rim surrounding the cBN grains (U.S. Pat. No. 6,265,337).

It has now been found that an intermediate phase between the ceramic binder phase and the hard dispersed cBN phase can actually decrease the edge toughness of the insert material because one very important mechanism for toughening, namely crack deflection, is minimized. If the bonding between the different phases in the material is too strong, a formed crack will easily propagate through the material in a very straight manner leading to a low value of fracture toughness. If the bonding is too low, it would mean a significantly reduced wear resistance. If, however, the bonding is balanced, meaning it should be lower than the intrinsic strength of the grains, the crack will preferably propagate along the grain boundaries meaning higher toughness. The desired strength of the bonding of the cBN grains and the ceramic binder can be achieved by carefully controlling the sintering temperature and the reactivity of the raw materials.

U.S. Pat. No. 4,343,651 disclose a sintered compact having a cBN concentration above 80 wt % wherein the $TiB_2$ can be minimized by the addition of Cu and/or Fe.

There is a need of further improved cBN-based tools since a higher productivity with reduced costs is required from the industry. Generally this implies higher cutting speeds and in particular higher cutting depths and feeds often in combination with interrupted cuts. Consequently both improved wear and edge failure resistance are desired in order to meet the demands from the machining industry.

OBJECTS AND SUMMARY OF THE INVENTION

It is thus an object of the present invention to provide cBN-based tools with both improved wear and edge failure resistance.

It is a further object of the present invention to provide cBN-based tools with balanced bonding between the different phases.

It is a further object of the present invention to provide cBN-based tools essentially free of Fe and Cu.

These and other objects of the present invention are obtained by a cutting tool insert composed of a composite comprising a cBN-phase and a binder phase comprising a titaniumcarbonitride phase and a $TiB_2$ phase wherein in the XRD pattern from the composite using CuKα-radiation, the peak height ratio of the strongest (101) $TiB_2$ peak and the strongest cBN (111) peak is less than about 0.06, the (220) peak from the titanium carbonitride phase in the XRD-pattern intersects both vertical lines of the PDF-lines of TiC (PDF 32-1383) and TiN (PDF 38-1420) and the lowest intersected point height is at least about 0.15 of the maximum (220) peak height of the ceramic binder phase.

BRIEF DESCRIPTION OF THE DRAWINGS

FIG. 3 shows XRD patterns from the 220-peak of $TiC_{1-X}N_X$ of tools according to the present invention, FIG. 3a, and prior art, FIG. 3b. The patterns are obtained using point focus, 2θ correction, background subtraction and $K\alpha_2$ stripping. FIG. 3a illustrates the 220 peak from the titanium carbonitride phase and the intersecting points of the PDF-lines of TiC and TiN that B points at.

DETAILED DESCRIPTION OF THE PREFERRED EMBODIMENTS

The present invention relates to a cutting tool insert for machining of hardened steel, hot and cold working tool steel, die steel, case hardened steel, high speed steel and ductile grey cast iron. The cutting tool insert can be either a solid cBN tool or a cBN compact attached to a cemented carbide substrate. It is composed of a coated or uncoated composite comprising a cBN-phase and a binder phase comprising a titaniumcarbonitride phase and a $TiB_2$ phase. Preferably, the composite comprises from about 40 to about 80, most preferably from about 55 to about 70, vol % cBN with an average grain size of less than about 5 µm, preferably from about 1 to about 4 µm, preferably with a bimodal cBN grain size distribution comprising more than about 10 vol-% of one fraction of from about 0.1 to about 1 µm and more than about 10 vol-% of the other fraction being from about 2 to about 5 µm. In the XRD pattern from the composite using CuKa-radiation the peak height ratio of the strongest $TiB_2$ peak and the strongest cBN peak is equal to or less than about 0.06, preferably equal to or less than about 0.045 and most preferably equal to or less than about 0.03. The ratio is determined as the peak height ratio between the strongest $TiB_2$ (PDF 35-0741) peak (101) and strongest cBN (PDF 35-1365) peak (111), $I_{TiB2(101)}/I_{cBN(111)}$. In addition the peak height ratio from the strongest peak of any borides of Ti, W, Co, Al and combinations thereof, except $TiB_2$, and the strongest cBN peak is less than about 0.06.

Figure 3A:
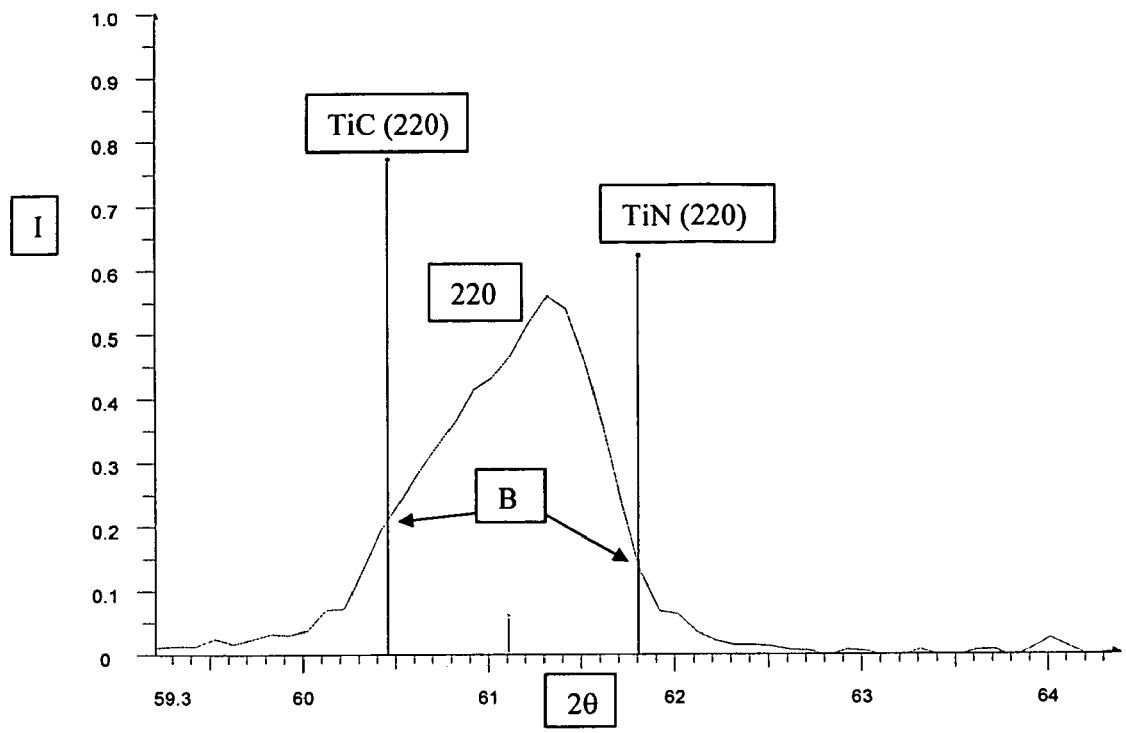

A further characteristic of the invention is that the (220) peak from the titanium carbonitride phase in the XRD-pattern intersects both vertical lines of the abovementioned PDF-lines of TiC (PDF 32-1383) and TiN (PDF 38-1420) and the lowest intersected point height is at least about 0.15, preferably at least about 0.20, of the maximum 220 peak height of the ceramic binder phase, see FIG. 3a. This indicates a broad compositional range of $TiC_{1-X}N_X$ from TiC to TiN. This is determined using point focus which is preferred in order to characterise small samples often brazed to a cemented carbide substrate without obtaining interfering diffraction noise from the substrate. The 220 peak is used since no other peaks are interfering at this particular angle interval of 59 to 62 deg. 2θ.

Material according to the invention may further comprise up to about five weight percent tungsten carbide from the milling with cemented carbide balls and alumina formed from reaction between Al and unavoidable oxygen in the raw materials. The amounts of Cu and Fe in the material according to the present invention are in the range of a technical impurity. The total amount of Cu and/or Fe is preferably below about 1 wt %, most preferably below about 0.5 wt %.

The cBN cutting tool insert according to the present invention is made using conventional powder metallurgical techniques like milling, pressing and sintering at elevated pressure. Powders forming the ceramic binder phase, Ti(C,N), stoichiometric or preferably substoichiometric and the metallic binder phase, Al, are premilled in an attritor mill to a very fine grained powder. The attrition milled powder is then mixed and milled together with the cBN powder raw material. After milling, the powder is dried and compacted to form a green circular compact. The green compact is then presintered at a temperature between about 900 to about 1250° C. for about 1 hour.

The green presintered compact is then sintered either by itself or on a cemented carbide plate in an ultra high pressure sintering apparatus at a pressure of about 5 GPa in the temperature range of about 1300° C. The sintering temperature and time is chosen so that a complete sintering is achieved with respect to porosity but excess temperatures and times must be avoided in order to minimize the chemical reaction between the ceramic binder and the hard cBN phase. This optimum sintering temperature depends on the composition, stoichiometry of the ceramic binder phase and grain size of all the raw materials. It is within the purview of the skilled artisan to determine by experiments the conditions necessary to obtain the desired microstructure using his equipment. The temperature is generally in the range from about 1200 to about 1325° C.

The sintered body is then cut into desired shape using an arc discharge wire-cut after top and bottom grinding. The sintered cBN compact pieces are then brazed on to a cemented carbide substrate and ground to desired shape and dimension as known in the art, e.g., WO 2004/105983. In another embodiment, the sintered cBN compact piece is ground to desired shape and dimension without being brazed to a cemented carbide substrate (solid cBN). The ground inserts may further be coated with wear resistant PVD and CVD layers as known in the art e.g. TiN, (Ti,Al)N, and $Al_2O_3$.

The invention is additionally illustrated in connection with the following examples, which are to be considered as illustrative of the present invention. It should be understood, however, that the invention is not limited to the specific details of the examples.

EXAMPLE 1 cBN-bodies according to the present invention were prepared by ball milling powders of 65 vol % cBN with bimodal grain size distribution comprising 30 vol-% of 0.2-0.6 µm cBN grains and the rest being 2-4 µm together with a non-stoichiometric ceramic binder phase $Ti(C_{0.3}N_{0.7})_{0.8}$ and 6 wt % Al binder phase. The binder and ceramic binder had been attrition milled to produce a fine grained intimate mixture thereof prior to ball milling with cBN.

After ball milling the powder was dried and compacted to form a green disc with a diameter of 40 mm. The disc was presintered at a temperature of about 900° C. for 1 hour.

The presintered compact was then sintered in an ultra high pressure sintering apparatus at a pressure of 5 GPa and a temperature of 1300° C.

The cBN-material was analyzed in a Bruker D8 Discover diffractometer under the following conditions:

TABLE 1

| General diffractometer set-up | Diffraction pattern operations |
|---|---|
| 40 kV and 100 mA | Background subtraction |
| Primary side | $K\alpha_2$ strip of the peaks |
| Cu Kα radiation | 2θ correction towards the cBN |
| Flat graphite monochromator | PDF-file, 35-1365 |
| φ 0.5 mm point focus collimator | |
| Secondary side | |
| PSD detector | |
| Distance between detector and sample holder was 16 cm | |

Figure 1A:
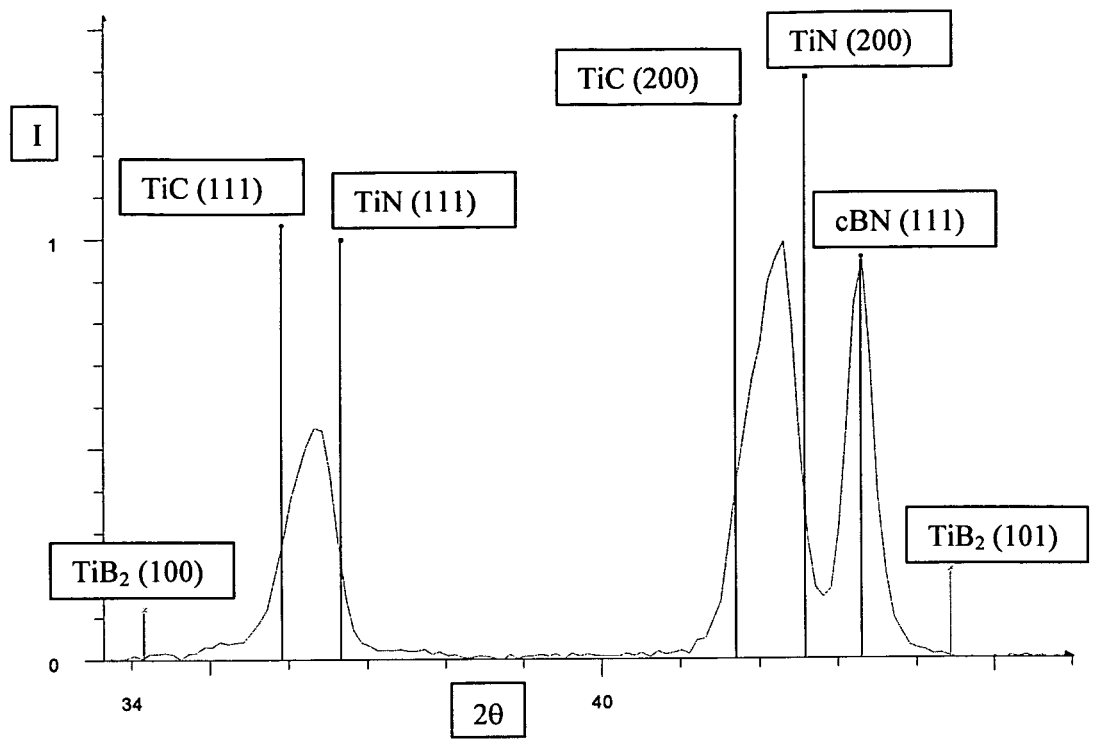
FIG. 1 shows XRD patterns using point focus, 2θ correction, background subtraction and $K\alpha_2$ stripping from a cBN material according to the present invention and according to prior art. The vertical lines corresponds to the structural information taken the public PDF-database (Powder Diffraction File by the International Centre for Diffraction Data, ICDD) and represent the chemical compounds of interest and additionally the name and Miller index of each chemical compound is given above each line.

The result is shown in FIG. 1a. For comparison a commercial cBN material according to prior art was analyzed with the result shown in FIG. 1b. The cBN material according to prior art comprises about 60 vol % cBN with a grain size of about 2-5 µm, balanced with a titanium carbonitride and an Al content of about 5 wt %.

In addition, the ceramic binder phase of the two materials was analyzed using the conditions according to Table 1 with the results shown in FIG. 3a, invention, and 3b, prior art.

Figure 1B:
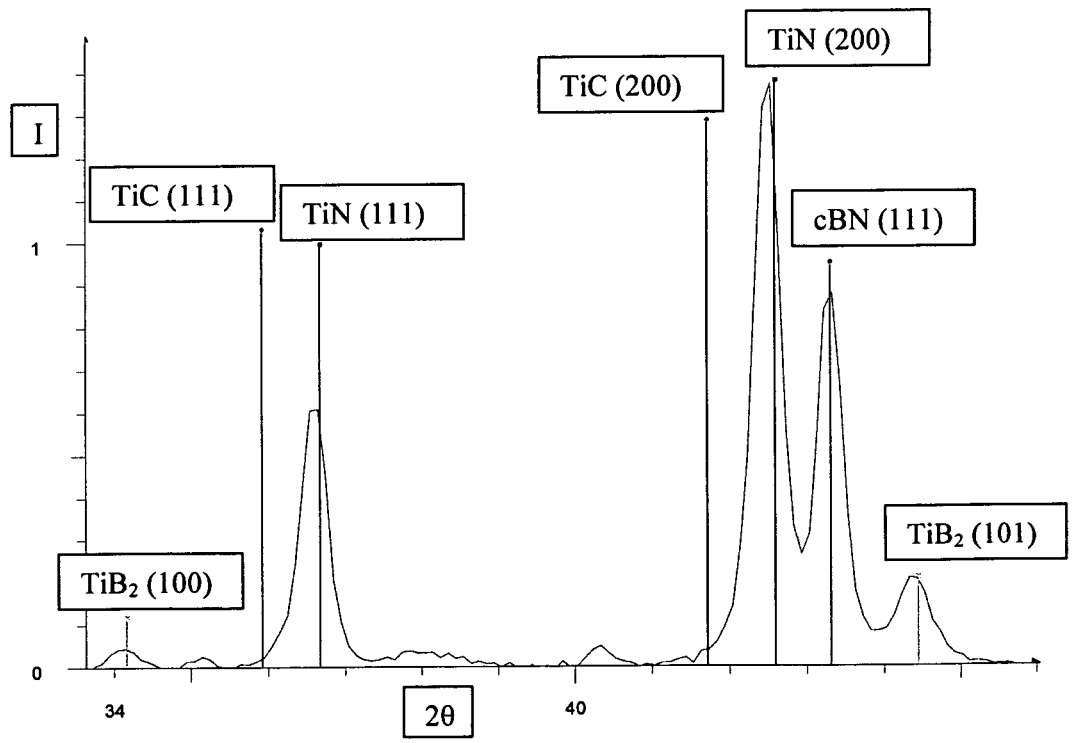
Figure 2A:
FIG. 2a shows a SEM backscattered image in 5000× of a typical crack deflection (D) in the cBN material according to the present invention. The dark grain is cBN and the light matrix is ceramic binder phase.
Figure 2B:
FIG. 2b shows the typical straight cracks in a cBN tool according to prior art.

From FIG. 1a and FIG. 1b it is clear that the main difference between the inserts is the absence of the boride reaction phase, particularly $TiB_2$ or any borides of Ti, W, Co, Al or combinations of these. The strongest peaks of interest from the abovementioned $TiB_2$ is expected to be found in the chosen 2 θ region in FIG. 1. The peak height ratio of the strongest TiB$_2$ peak and the strongest cBN peak in the insert according to the present invention is 0 whereas it in the prior art insert is 0.23.

Figure 3B:
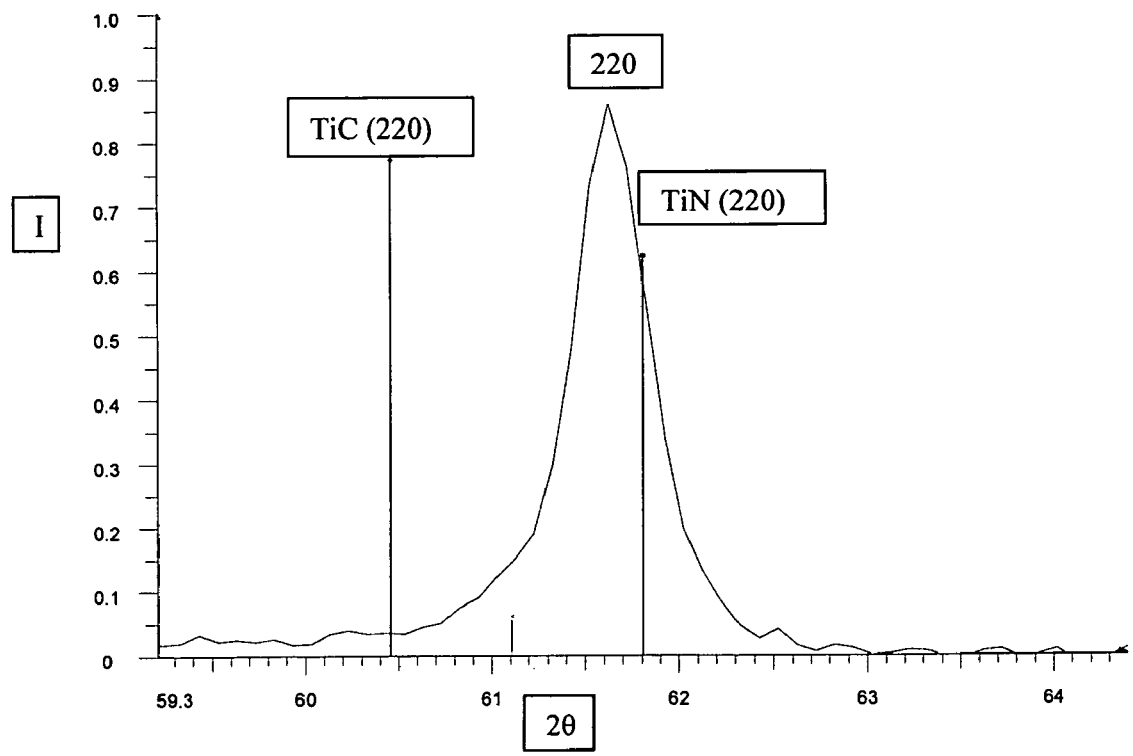

FIG. 3a shows that the ceramic binder comprises a broad compositional range of TiC$_{1-X}$N$_X$ in the insert according to the invention. FIG. 3b shows that in the prior art insert there is a relatively narrow Ti(C,N) peak constituting the main ceramic binder phase. In order to avoid overlapping from interfering peaks, the 2θ-interval of 59-64 deg. was selected for the description of the binder phase, which is illustrated in FIGS. 3a. and b. FIG. 3a shows that the (220) diffraction peak of the TiC$_{1-X}$N$_X$ intersects both the TiN and TiC PDF-lines, B in FIG. 3a. The lowest intersected point height is that of TiN, which is 0.24 of the maximum 220 peak height of the binder phase. In contrast, FIG. 3b, the prior art comprises a TiCN that only intersect one line, in this case TiN. The lowest point of intersection is that of TiC which is=0.

EXAMPLE 2

The sintered body from example 1 was then cut into a shape according to the Safe-Lok concept using an arc discharge wire-cut after top and bottom grinding to an insert with designation CNGA 120408. The inserts were tested with respect to toughness in a heavy intermittent turning operation under the following conditions:

| Work piece material: | Hardened Ball Bearing Steel, HRC 56. |
|---|---|
| Speed: | 120 m/min |
| Feed: | 0.1-0.6 mm/rev |
| Depth of cut (DOC): | 0.1-0.6 mm |
| Dry cutting | |

Then operation was a facing operation of a ring with a 10 mm slot. The feed and DOC were increased in intervals of 0.02 mm until chipping or fracture.

As a reference the prior art inserts from Example 1 were used.

Each test was repeated 4 times. The average value of feed and DOC are shown in Table 2.

| | Maximum feed mm/rev/DOC mm |
|---|---|
| Prior art | 0.47 |
| Invention | 0.62 |

The inserts according to the present invention performed 30% better in fracture/chipping resistance in comparison with inserts representative of prior art at the same time the wear resistance was the same.

EXAMPLE 3

The obtained cutting inserts according to the present invention from Example 1 were brazed to a cemented carbide body according to the Safe-Lok concept and further processed as to form a cutting tool insert with designation CNGA 120408. The inserts were tested in a continuous turning operation with respect to wear resistance under the following conditions:

| Work piece material: | Case Hardened Steel, HRC 52. |
|---|---|
| Speed: | 200 m/min |
| Feed: | 0.2 mm/rev |
| Depth of cut (DOC): | 0.15 mm |
| Dry cutting | |

As a reference the prior art inserts from Example 1 were used.

The time to reach a flank wear (VB) of 0.12 mm was measured. Average values after four tests are shown in Table 3.

| | Time (min) |
|---|---|
| Prior art | 28 |
| Invention | 30 |

Material according to the invention has a slightly improved wear resistance compared to prior art.

Although the present invention has been described in connection with preferred embodiments thereof, it will be appreciated by those skilled in the art that additions, deletions, modifications, and substitutions not specifically described may be made without department from the spirit and scope of the invention as defined in the appended claims.

The invention claimed is:

1. A cutting tool insert composed of a composite comprising a cBN-phase and a binder phase comprising a titanium carbonitride phase and a TiB$_2$ phase, wherein, in a XRD pattern from the composite using CuKa-radiation, (i) a peak height ratio of a strongest TiB$_2$ (101) peak and a strongest cBN (111) peak is less than about 0.06, and (ii) a (220) peak from the titanium carbonitride phase in the XRD-pattern intersects both vertical lines of a PDF-line of TiC (PDF 32-1383) and a PDF-line of TiN (PDF 38-1420) and has a lowest intersected point height that is at least about 0.15 of a maximum in the (220) peak height of the binder phase.

2. A cutting tool insert of claim 1 wherein the peak height ratio is less than about 0.045.

3. A cutting tool insert of claim 1 wherein the peak height ratio is less than 0.03.

4. A cutting tool insert of claim 1 wherein said composite comprises from about 40 to about 80 vol % cBN phase.

5. A cutting tool insert of claim 1 wherein a peak height ratio from a strongest peak of any borides of Ti, W, Co, Al and combinations thereof and the strongest cBN (111) peak is less than about 0.06.

6. A cutting tool insert of claim 1 wherein the cBN-phase has a bimodal cBN grain size distribution comprising a first fraction of at least about 10% by volume having a first mode in a range from about 0.1 to about 1 μm grain size and a second fraction of at least about 10% by volume having a second mode in a range from about 2 to about 5 μm grain size.

7. A cutting tool of claim 1 further comprising tungsten carbide and/or alumina in the cBN phase.

8. A cutting tool insert of claim 1 wherein a total Cu and Fe content is less than about 0.5 wt %.

9. A cutting tool insert, comprising
a cBN-phase; and
a binder phase,
wherein the binder phase includes a titanium carbonitride phase and a TiB$_2$ phase, wherein a XRD pattern of the insert using CuKa-radiation includes a TiB$_2$ (101) peak, a cBN (111) peak, and a (220) peak from the titanium carbonitride phase wherein a peak height ratio of a strongest TiB2 (101) peak to a strongest cBN (111) peak is less than about 0.06, wherein the (220) peak from the titanium carbonitride phase intersects a PDF-line of TiC (PDF 32-1383) at a first intersect point and a PDF-line of TiN (PDF 38-1420) at a second intersect point, and wherein a lower of a height of the first intersect point and a height of the second intersect point is at least about 0.15 of a maximum peak height in the (220) peak from the titanium carbonitride phase.

10. A cutting tool insert of claim 9 wherein the peak height ratio is less than about 0.045.

11. A cutting tool insert of claim 9 wherein the peak height ratio is less than 0.03.

12. A cutting tool insert of claim 9 wherein the insert comprises from about 40 to about 80 vol % cBN phase.

13. A cutting tool insert of claim 9 wherein the XRD pattern of the insert using CuKa-radiation includes a further peak from a boride of one or more of Ti, W, Co, Al and combinations thereof other than the TiB$_2$ (101) peak and wherein a peak height ratio of a strongest further peak from the boride of one or more of Ti, W, Co, Al and combinations thereof to the strongest cBN (111) peak is less than about 0.06.

14. A cutting tool of claim 9 wherein the cBN phase includes one or more of tungsten carbide and alumina.

15. A cutting tool insert of claim 9 wherein a total Cu and Fe content is less than about 0.5 wt %.

16. A cutting tool insert of claim 9 wherein the insert comprises a bimodal cBN grain size distribution including a first fraction and a second fraction, wherein the first fraction has a first mode in a range from a grain size of about 0.1 μm to a grain size of about 1 μm and a second fraction has a second mode in a range from a grain size of about 2 μm to a grain size of about 5 μm, and wherein the first fraction is at least about 10% by volume and the second fraction is at least about 10% by volume.

* * * * *